US009689372B2

(12) United States Patent
Gonzalez

(10) Patent No.: US 9,689,372 B2
(45) Date of Patent: Jun. 27, 2017

(54) VERTICAL-AXIS WIND TURBINE WITH PROTECTIVE SCREEN

(71) Applicant: Aurelio Izquierdo Gonzalez, Cadiz (ES)

(72) Inventor: Aurelio Izquierdo Gonzalez, Cadiz (ES)

(*) Notice: Subject to any disclaimer, the term of this patent is extended or adjusted under 35 U.S.C. 154(b) by 404 days.

(21) Appl. No.: 14/507,619

(22) Filed: Oct. 6, 2014

(65) Prior Publication Data

US 2015/0098795 A1  Apr. 9, 2015

(30) Foreign Application Priority Data

Oct. 8, 2013  (ES) .................................. 201300998

(51) Int. Cl.
*F03D 3/04* (2006.01)
*F03D 3/00* (2006.01)
(Continued)

(52) U.S. Cl.
CPC ........... *F03D 3/0472* (2013.01); *F03D 3/005* (2013.01); *F03D 3/0418* (2013.01);
(Continued)

(58) Field of Classification Search
CPC ...... F03D 3/0472; F03D 80/30; F03D 3/0436; F03D 3/0418; F03D 9/007; F03D 3/005;
(Continued)

(56) References Cited

U.S. PATENT DOCUMENTS

| 1,096,057 A | * | 5/1914 | Rees | ..................... | F03D 3/0472 |
| | | | | | 415/2.1 |
| 1,460,114 A | * | 6/1923 | Shelton | ................. | F03D 3/0472 |
| | | | | | 415/4.2 |

(Continued)

FOREIGN PATENT DOCUMENTS

| CA | 1229796 A1 | 12/1987 |
| CA | 2433951 A1 | 1/2005 |

(Continued)

OTHER PUBLICATIONS

International Search Report and Written Opinion in PCT/EP2014/071424, mailed Feb. 10, 2015.

*Primary Examiner* — Craig Kim
*Assistant Examiner* — Eldon Brockman
(74) *Attorney, Agent, or Firm* — One3 IP Management, P.C.; Justin G. Sanders; Peter D. Weinstein

(57) ABSTRACT

A vertical-axis wind turbine apparatus is disclosed. In at least one embodiment, the apparatus provides a substantially vertically-oriented main shaft. A blade assembly is coaxially aligned with and rotatably engaged about the main shaft. The blade assembly provides an at least one blade radially projecting therefrom. A housing is rotatably engaged with the main shaft and configured for selectively encompassing the blade assembly. A first screen is integral with the housing and configured for shielding a return portion of the blade assembly. A second screen is rotatably engaged with the housing and configured for selectively moving between a retracted position, wherein the second screen is positioned (Continued)

substantially adjacent to the first screen such that a catch portion of the blade assembly is exposed, and a deployed position, wherein the second screen is rotated away from the first screen for at least partially shielding the catch portion from the wind.

19 Claims, 6 Drawing Sheets

(51) Int. Cl.
    *F03D 7/06*     (2006.01)
    *F03D 9/00*     (2016.01)
    *F03D 80/30*     (2016.01)
    *F03D 9/25*     (2016.01)

(52) U.S. Cl.
    CPC ............ *F03D 3/0436* (2013.01); *F03D 7/06* (2013.01); *F03D 9/007* (2013.01); *F03D 9/25* (2016.05); *F03D 80/30* (2016.05); *F05B 2240/13* (2013.01); *F05B 2270/1011* (2013.01); *Y02E 10/74* (2013.01)

(58) Field of Classification Search
    CPC ... F03D 9/002; F03D 7/06; F03D 3/04; F03D 9/34; F03D 9/35; F03D 9/37; F03D 9/39; F03D 9/41; F03D 9/43; F03D 9/45; F03D 9/46; F05B 2240/13; F05B 2270/1011
    See application file for complete search history.

(56) References Cited

U.S. PATENT DOCUMENTS

| | | | |
|---|---|---|---|
| 1,812,400 A * | 6/1931 | Gilley | F03D 3/0472 415/4.2 |
| 1,974,008 A * | 9/1934 | Biehn | F03D 3/0472 415/4.4 |
| 3,895,882 A * | 7/1975 | Moyer | F03D 3/0472 415/4.4 |
| 4,031,405 A * | 6/1977 | Asperger | F03D 3/0472 290/44 |
| 4,115,027 A | 9/1978 | Thomas | |
| 4,321,005 A * | 3/1982 | Black | F03D 3/02 415/123 |
| 4,365,929 A * | 12/1982 | Retz | F03D 3/04 415/187 |
| 4,474,529 A * | 10/1984 | Kinsey | F03D 3/0472 415/4.2 |
| 4,606,697 A * | 8/1986 | Appel | F03D 3/02 415/4.4 |
| 5,531,567 A | 7/1996 | Hulls | |
| 6,394,745 B1 | 5/2002 | Quraeshi | |
| 6,465,899 B2 | 10/2002 | Roberts | |
| 6,784,566 B2 | 8/2004 | Thomas | |
| 6,942,454 B2 | 9/2005 | Ohlmann | |
| 8,193,657 B2 | 6/2012 | Paluszek et al. | |
| 8,253,266 B2 | 8/2012 | Elliott et al. | |
| 8,482,144 B2 * | 7/2013 | Khedekar | F03D 3/005 290/44 |
| 8,587,145 B2 | 11/2013 | Andujar | |
| 8,591,170 B1 * | 11/2013 | Rawls | F03D 3/002 415/211.1 |
| 8,616,830 B2 * | 12/2013 | Unno | F03B 3/183 290/43 |
| 8,740,544 B2 * | 6/2014 | Keech | F03D 3/002 415/4.1 |
| 8,786,123 B2 * | 7/2014 | Bannister | F03D 3/002 290/55 |
| 9,222,462 B2 * | 12/2015 | Armstrong | F03D 3/065 |
| 2004/0265116 A1 | 12/2004 | Kaneda | |
| 2007/0224029 A1 | 9/2007 | Yokoi | |
| 2008/0150289 A1 * | 6/2008 | Fein | B60K 16/00 290/55 |
| 2010/0135768 A1 * | 6/2010 | Pitre | F03B 17/063 415/7 |
| 2010/0213720 A1 * | 8/2010 | Bailey | F03B 1/02 290/55 |
| 2011/0158787 A1 * | 6/2011 | Thacker, II | F03D 3/0472 415/1 |
| 2011/0250069 A1 * | 10/2011 | Quintal | F03D 3/002 416/111 |
| 2012/0007362 A1 * | 1/2012 | Bannister | F03D 3/002 290/44 |
| 2012/0061965 A1 * | 3/2012 | Khedekar | F03D 3/005 290/44 |
| 2012/0175879 A1 * | 7/2012 | Keech | F03D 3/002 290/44 |
| 2012/0195759 A1 | 8/2012 | Feldhaus | |
| 2012/0294705 A1 * | 11/2012 | Unno | F03B 3/183 415/151 |
| 2013/0001950 A1 * | 1/2013 | Armstrong | F03D 3/065 290/55 |
| 2013/0315703 A1 | 11/2013 | Dacus et al. | |
| 2014/0255190 A1 * | 9/2014 | Murata | F03D 3/02 416/9 |

FOREIGN PATENT DOCUMENTS

| | | |
|---|---|---|
| CA | 2439420 A1 | 3/2005 |
| DE | 19607592 A1 | 9/1997 |
| GB | 2434703 A | 8/2007 |
| GB | 2475843 A | 6/2011 |
| WO | 2008108637 A3 | 9/2008 |
| WO | 2010/021731 A2 | 2/2010 |
| WO | 2010/106337 A2 | 9/2010 |
| WO | 2010/118509 A1 | 10/2010 |

* cited by examiner

VERTICAL-AXIS WIND TURBINE WITH PROTECTIVE SCREEN

RELATED APPLICATIONS

This application claims priority and is entitled to the filing date of ES application number P201300998, filed on Oct. 8, 2013. The contents of the aforementioned application are incorporated by reference herein.

BACKGROUND

The subject of this patent application relates generally to wind turbines, and more particularly to a vertical-axis wind turbine apparatus having a protective screen.

Applicant(s) hereby incorporate herein by reference any and all patents and published patent applications cited or referred to in this application.

By way of background, for over a century, wind turbines have been utilized in converting wind-driven kinetic energy into electricity. In recent years, wind turbines have become an increasingly important source of renewable energy and are being used by many countries as part of a strategy to reduce reliance on fossil fuels. While most wind turbines are configured for rotating about a horizontal axis, a relatively newer type of wind turbine—known as a vertical-axis wind turbine ("VAWT")—is configured for rotating about a vertical axis. One advantage of this arrangement is that the wind turbine does not need to be pointed into the wind to be effective, which is an advantage on a site where the wind direction is highly variable. It is also an advantage when the wind turbine is integrated into a building because it is inherently less steerable. Also, the generator and gearbox are able to be placed near the ground, using a direct drive from the rotor assembly to the ground-based gearbox, which improves accessibility for maintenance purposes.

The speed at which a wind turbine—both horizontal-axis and vertical-axis—rotates must be controlled for efficient power generation and to keep the turbine components within design speed and torque limits. All wind turbines are designed for a maximum wind speed—often referred to as the "survival speed"—above which they will suffer mechanical damage. With respect to VAWT's, electrical or mechanical brakes are often employed and used for slowing down the blade rotation as needed to prevent the turbine from exceeding its survival speed. However, such braking means require a potentially significant expenditure of energy when utilized. Additionally, depending on the speeds, the heat generated by such braking has the potential to create a fire inside the nacelle if used to stop the turbine from full speed.

Therefore, there remains a need for minimizing the energy required to brake and protect a vertical-axis wind turbine during survival speed winds. Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a vertical-axis wind turbine apparatus having a selectively deployable protective screen. In at least one embodiment, the apparatus provides a substantially vertically-oriented main shaft. A blade assembly is coaxially aligned with and rotatably engaged about the main shaft. The blade assembly provides an at least one blade radially projecting therefrom. Additionally, the blade assembly has a circumference that comprises a catch portion, wherein the at least one blade catches the wind for rotation, and a return portion, wherein the at least one blade carries out its revolution about the main shaft before returning to catch the wind once again. A housing is rotatably engaged with the main shaft and configured for selectively encompassing the blade assembly. A first screen is integral with the housing and configured for shielding the return portion of the blade assembly circumference from the wind. A second screen is rotatably engaged with the housing and configured for selectively moving between a retracted position, wherein the second screen is positioned substantially adjacent to the first screen such that the catch portion of the blade assembly circumference is exposed, and a deployed position, wherein the second screen is rotated away from the first screen for at least partially shielding the catch portion from the wind. Thus, during use of the apparatus, the second screen is capable of selectively moving into the deployed position upon the occurrence of pre-determined environmental conditions that would otherwise cause the blade assembly to reach potentially damaging rotational speeds.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Figure 1:
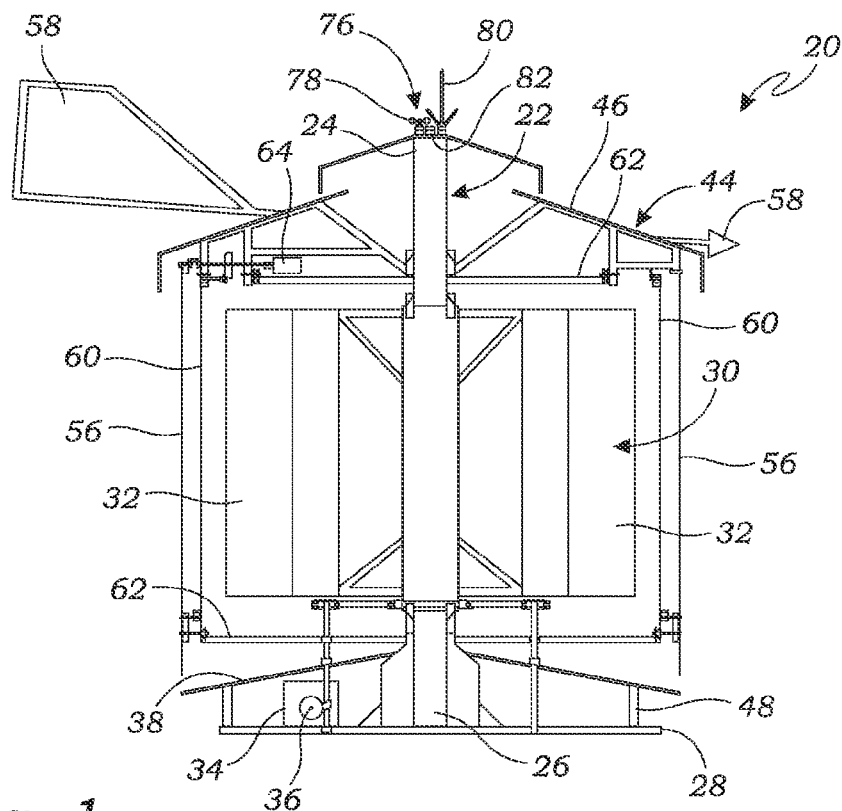
FIG. 1 is a side schematic view of an exemplary vertical-axis wind turbine apparatus, in accordance with at least one embodiment.
Figure 2:
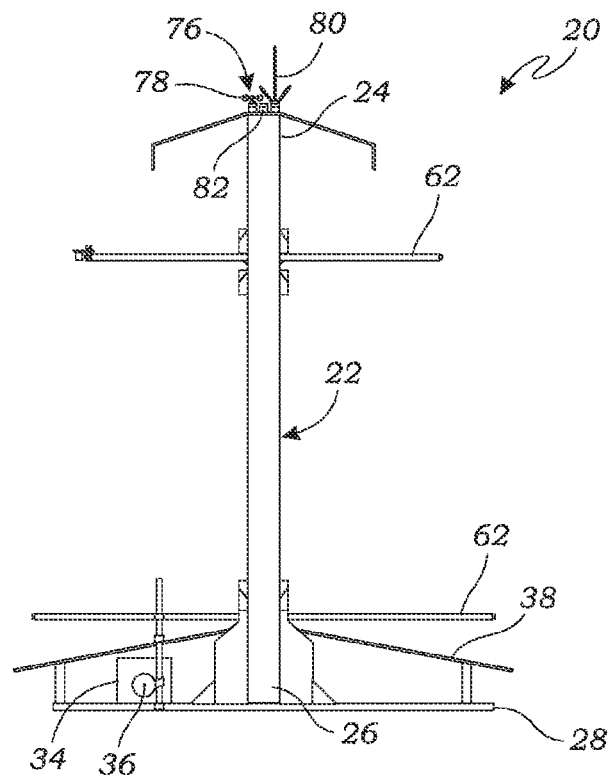
FIG. 2 is a partial side schematic view, showing certain non-moving components of the exemplary apparatus, in accordance with at least one embodiment.
Figure 3:
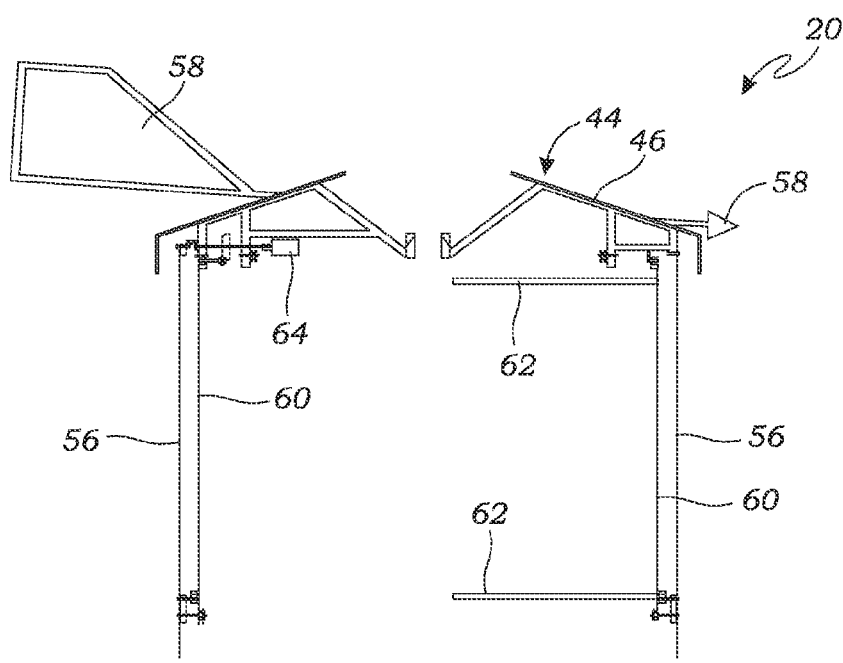
FIG. 3 is a partial side schematic view, showing certain movable components of the exemplary apparatus, in accordance with at least one embodiment.
Figure 4:
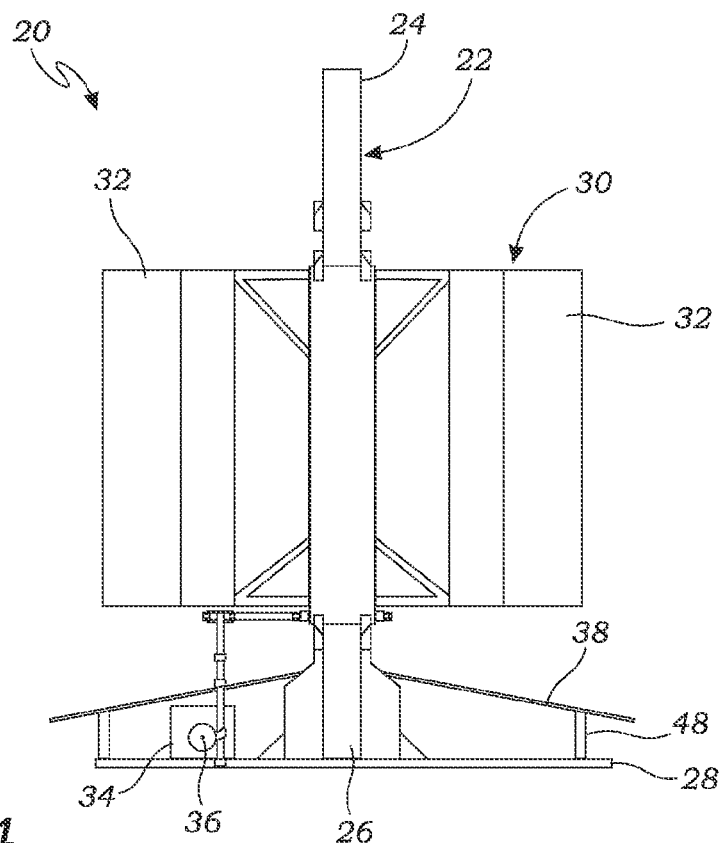
FIG. 4 is a partial side schematic view, showing certain movable components of the exemplary apparatus related to the generation of electrical and mechanical power, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Turning now to FIGS. 1-4, there are shown side schematic views of various isolated components of an exemplary vertical-axis wind turbine apparatus 20, in accordance with at least one embodiment. The apparatus 20 comprises, in at least one embodiment, a substantially vertically-oriented main shaft 22 having an upper end 24 and an opposing lower end 26. In at least one embodiment, the lower end 26 of the main shaft 22 provides an integral base plate 28 for mounting the apparatus 20 to an appropriate surface (i.e., the ground, a rooftop, etc.). In an alternate embodiment, the base plate 28 may be omitted such that the lower end 26 of the main shaft 22 is configured for being mounted to or otherwise engaged directly with the appropriate surface.

In at least one embodiment, a blade assembly 30 is coaxially aligned with and rotatably engaged about the main shaft 22. The blade assembly 30 provides an at least one blade 32 radially projecting therefrom, such that the at least one blade 32 is capable of rotating about the main shaft 22. As illustrated in the drawings, in at least one embodiment, each blade 32 is substantially vertically-oriented, in a plane parallel with the main shaft 22, and radially projects from the blade assembly 30 in a direction substantially perpendicular to the main shaft 22. At the outset, it should be noted that the respective size, shape, position and configuration of each blade 32 shown in the drawings is merely exemplary. In further embodiments, the blades 32 may take on any other size, shape, position or configuration now known or later developed. Additionally, in further embodiments, the blade assembly 30 may incorporate any number of blades 32 other than the specific number of blades 32 shown in the drawings. Thus, the blades 32 shown in the drawings are intended to simply illustrate at least one embodiment of the apparatus 20, and are not intended to be limiting in any way.

With continued reference to FIGS. 1-4, in at least one embodiment, the blade assembly 30 is mechanically linked to a gear box 34 configured for capturing and transferring the mechanical energy generated by the rotating blade assembly 30. This mechanical energy may then be applied to any machine or device that requires a rotating mechanism. In one such embodiment, the gear box 34 is mechanically linked to a generator 36 for converting the transferred mechanical energy into electricity. The electricity may then be pulled off and stored within one or more batteries, or transferred to a power grid, or even provided directly to one or more electrical machines or devices, for example—depending on the context in which the apparatus 20 is to be used. In at least one such embodiment, each of the gear box 34 and generator 36 is positioned proximal the lower end 26 of the main shaft 22 so as to allow for easy access for maintenance purposes. In one such embodiment, the apparatus 20 provides a removable cover 38 positioned and configured for selectively shielding the gear box 34 and generator 36 from environmental elements. In still further embodiments, the gear box 34 and/or generator 36 may be positioned elsewhere on or near the apparatus 20.

As best illustrated in the top schematic views of FIGS. 5 and 6, in at least one embodiment, and as discussed further below, the blade assembly 30 has a circumference C that comprises a catch portion 40, wherein the at least one blade 32 catches the wind W for rotation, and a return portion 42, wherein the at least one blade 32 carries out its revolution about the main shaft 22 before returning to catch the wind W once again.

Figure 7:
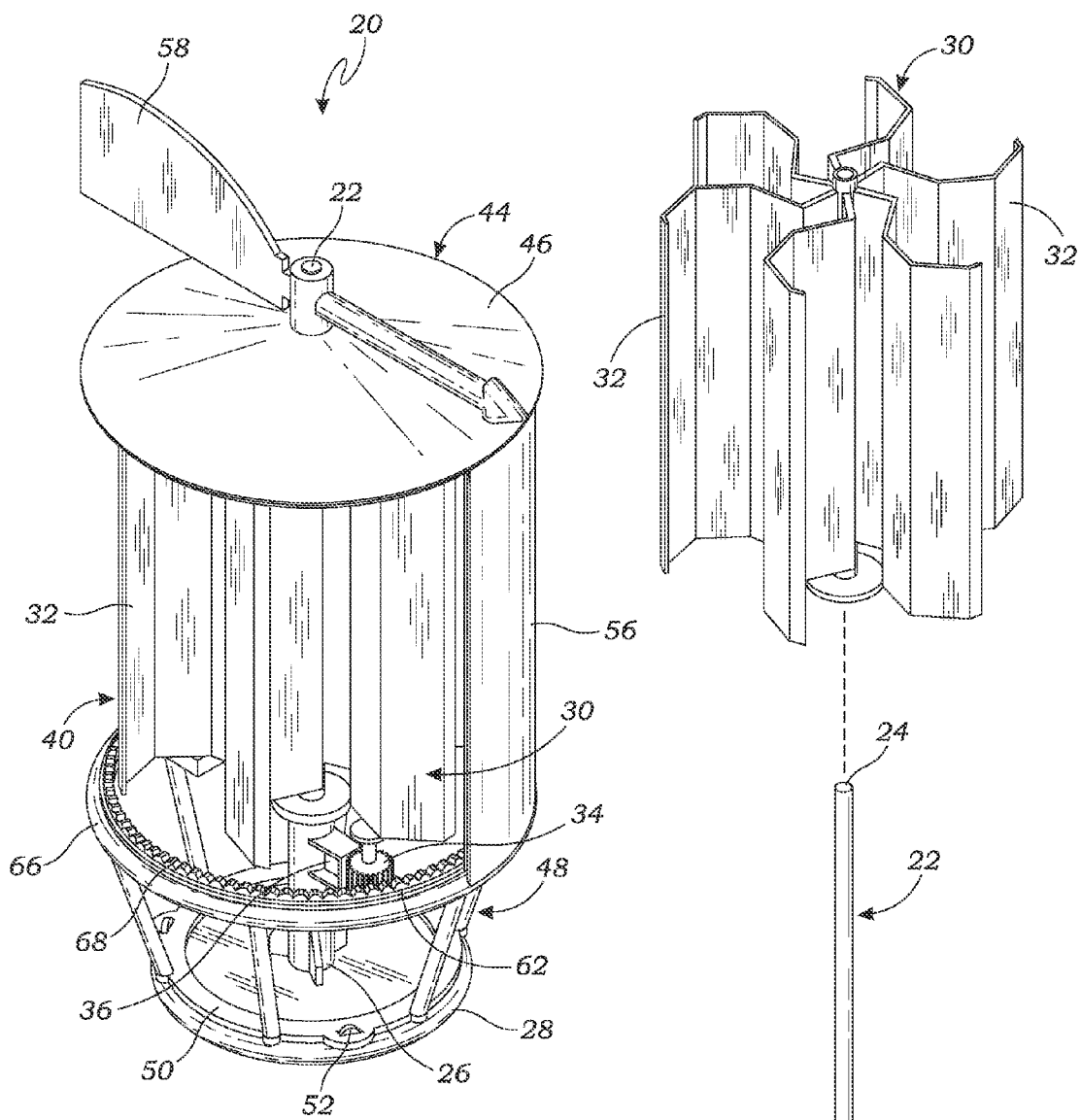
FIG. 7 is an assembled perspective view of a further exemplary vertical-axis wind turbine apparatus, in accordance with at least one embodiment.
Figure 8:
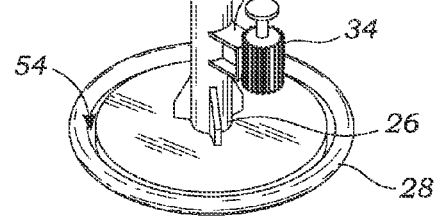
FIG. 8 is an exploded perspective view of a rigid base component and turbine of said further exemplary apparatus, in accordance with at least one embodiment.

Referring again to FIG. 1, in at least one embodiment, the apparatus 20 further provides a housing 44 rotatably engaged with the main shaft 22 and configured for selectively encompassing the blade assembly 30. In at least one such embodiment, the housing 44 provides a housing top 46 positioned proximal the upper end 24 of the main shaft 22, and a housing frame 48 positioned a distance below the housing top 46. In at least one embodiment, shown best in FIG. 1, the housing top 46 is coaxially aligned with and rotatably engaged about the main shaft 22. In another embodiment, shown best in FIGS. 7 and 8, the housing frame 48 is rotatably engaged with the base plate 28 of the main shaft 22. In a bit more detail, in at least one such embodiment, a bottom end 50 of the housing frame 48 provides a plurality of rollers 52—i.e., wheels, bearings, etc.—positioned and configured for riding within a circular frame track 54 provided by the base plate 28. In yet another embodiment, each of the housing top 46 and housing frame 48 is rotatably engaged with the main shaft 22. It should be noted that the particular configurations and positions of each of the housing top 46, housing frame 48 and main shaft 22 shown in the drawings that allow for such rotatable functionality are merely exemplary. Accordingly, any other configurations or positions of such components that allow the housing 44 to selectively rotate relative to the main shaft 22, now known or later developed, may be substituted in further embodiments and are intended to be included within the scope of the present invention.

Figure 5:
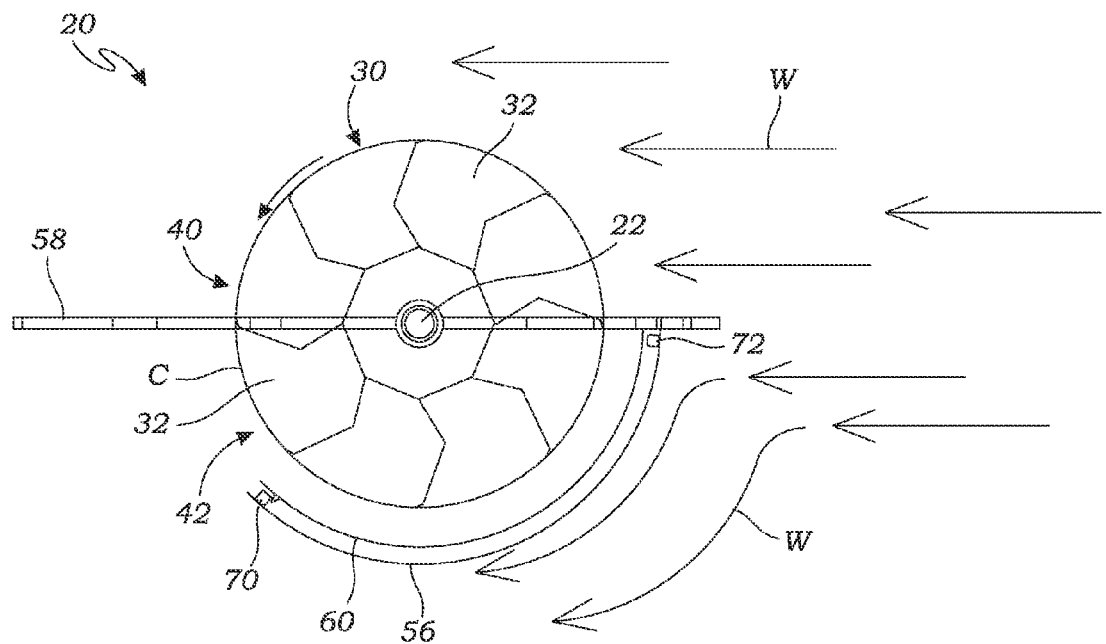
FIGS. 5 and 6 are top schematic views of the exemplary apparatus, illustrating the interaction of the exemplary apparatus with wind, in accordance with at least one embodiment.
Figure 6:
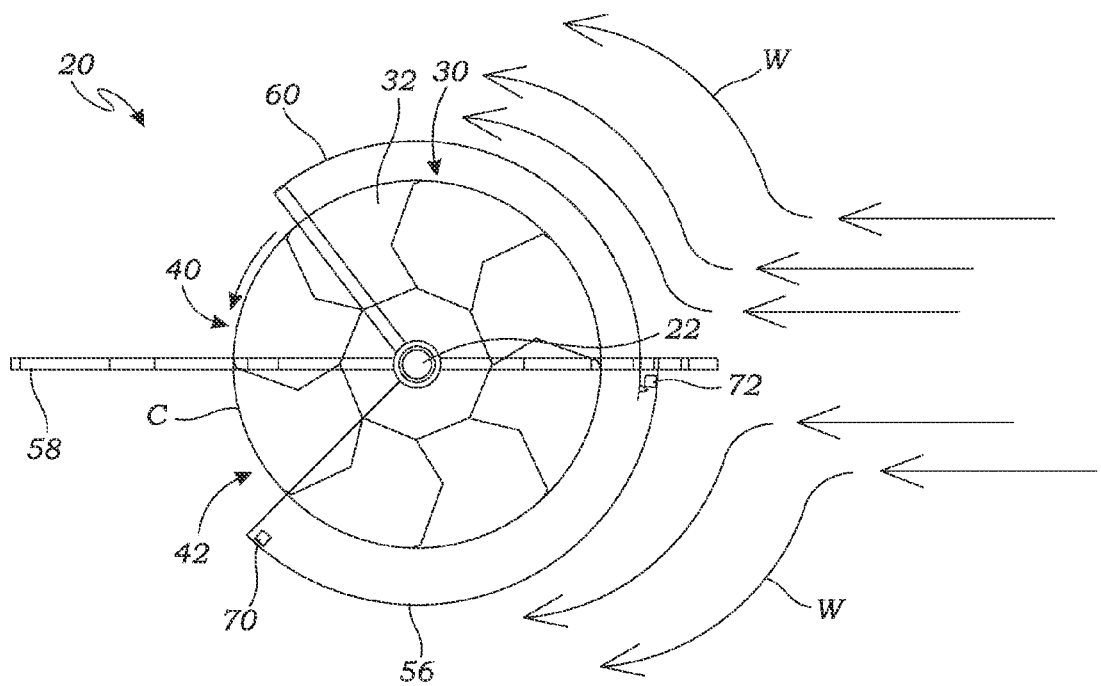

As shown in FIGS. 5 and 6, a first screen 56 is integral with the housing 44 and is configured for shielding the return portion 42 of the blade assembly 30 from the wind W. As such, the first screen 56 prevents the wind W from impacting the at least one blade 32 as it carries out its revolution about the main shaft 22 in the return portion 42 before returning to catch portion 40, which would otherwise create a counteractive resistance and slow the rotational speed of the blade assembly 30.

In at least one embodiment, the housing 44 also provides a weather vane 58 fixedly mounted on the housing top 46. Because the housing 44 is rotatably engaged with the main shaft 22, the weather vane 58—as a result of the wind W—is able to cause the housing 44 to selectively rotate about the main shaft 22. Additionally, in at least one such embodiment, as illustrated best in FIGS. 5 and 6, the weather vane 58 is positioned such that the wind W will always cause the housing 44 to rotate into a position that orients the catch portion 40 of the blade assembly 30 into the wind W. Thus, regardless of the direction of the wind W, the weather vane 58 allows the housing 44—and, thus, the catch portion 40 of the blade assembly 30—to dynamically adjust so as to be in an optimal orientation. In at least one alternate embodiment, rather than a weather vane 58, the housing 44 may incorporate other systems, devices or mechanisms that allow the housing 44 to achieve this same dynamically adjustable functionality. For example, in at least one such alternate embodiment, the housing 44 rotation may be gear-driven with such gears controlled by a computer or microprocessor that is capable of determining wind W direction and, in turn, an optimal orientation for the housing 44. In another such alternate embodiment, the housing 44 orientation may simply be manually adjusted by hand. Thus, the particular embodiments described herein should be viewed as merely exemplary rather than limiting.

Figure 9:
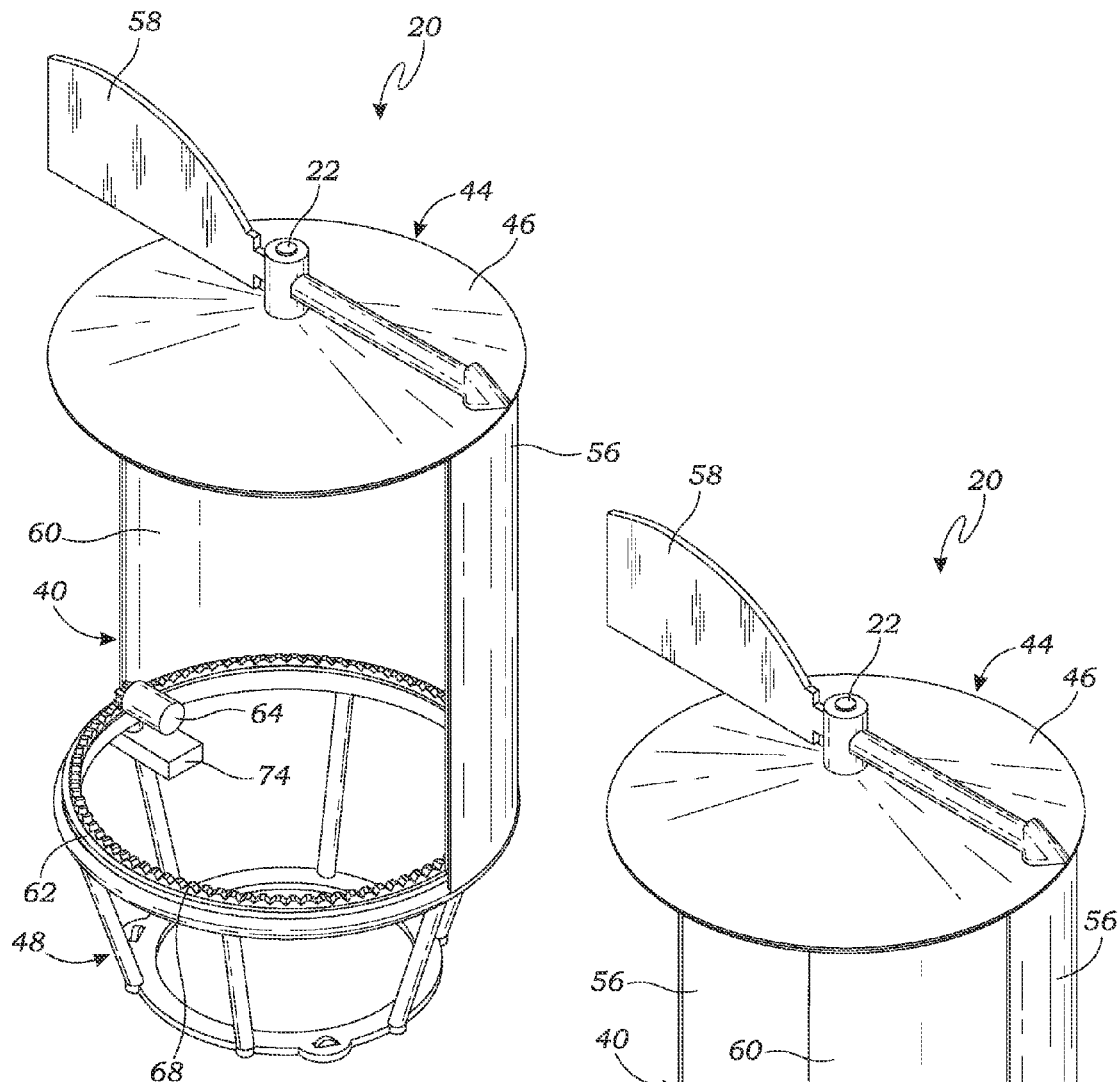
FIGS. 9-11 are assembled perspective views of a screen sub-assembly of said further exemplary apparatus, in accordance with at least one embodiment.
Figure 10:
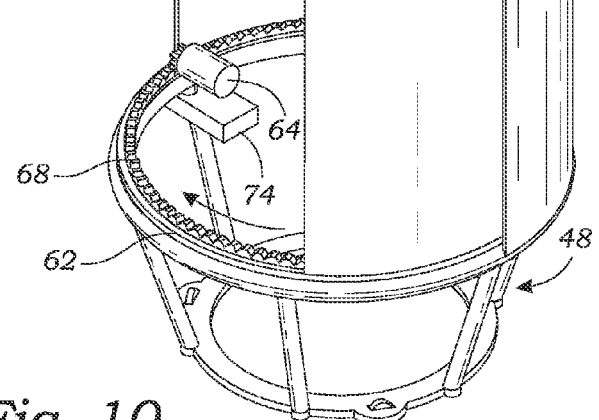
Figure 11:
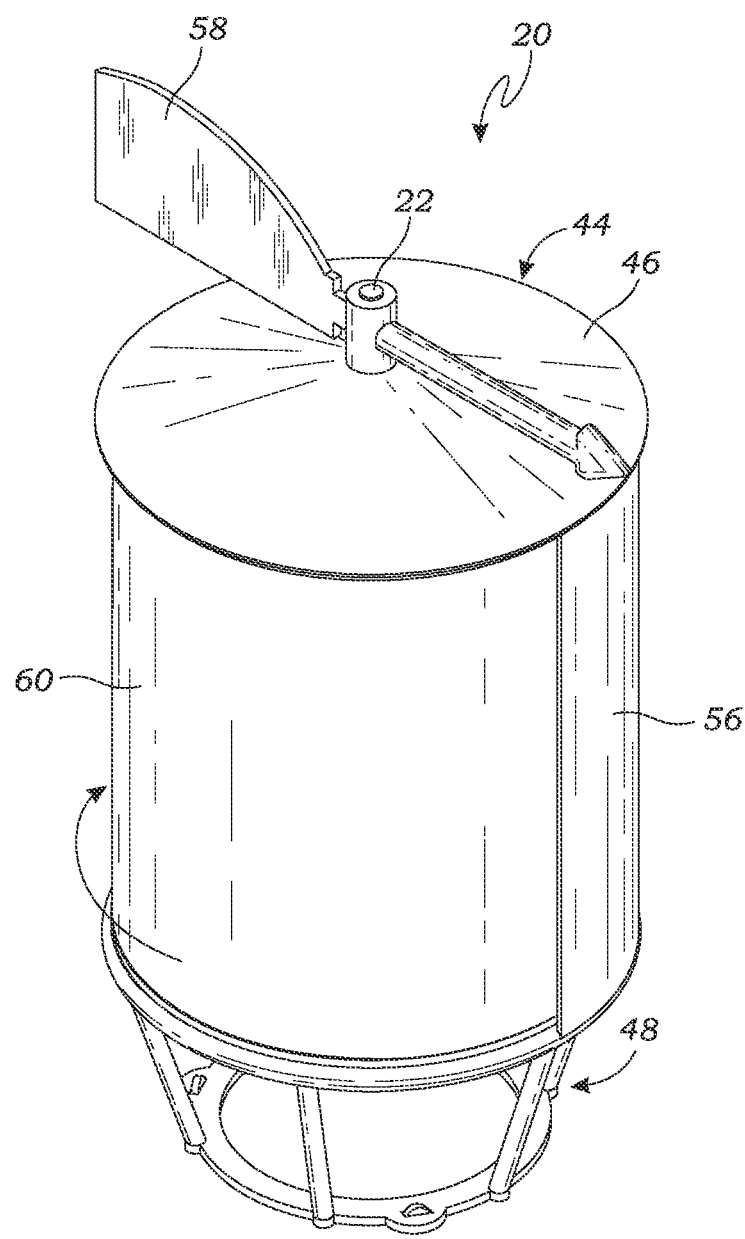

In at least one embodiment, a second screen 60 is rotatably engaged with the housing 44 and is configured for selectively moving between a retracted position (FIG. 5)—wherein the second screen 60 is positioned substantially adjacent to the first screen 56 such that the catch portion 40 of the blade assembly 30 circumference is exposed—and a deployed position (FIG. 6)—wherein the second screen 60 is rotated away from the first screen 56 for at least partially shielding the catch portion 40 from the wind W. As such, when in the deployed position, the second screen 60 prevents (or at least reduces) the wind W from impacting the at least one blade 32 in the catch portion 40—depending on how much of the catch portion 40 is shielded from the wind W by the second screen 60 in a given embodiment. The importance of this feature is discussed further below. As generally shown, in the exemplary embodiments, the first and second screens 56, 60 are both curved, and the second screen 60 is arranged substantially coaxially with the first screen 56, each then generally being coaxial with the housing 44 and main shaft 22 as well. Furthermore, as illustrated, the second screen 60 is interior of the first screen 56 or moves or rotates along an arc of a smaller radius relative to the first screen 56, whereby the second screen 60 is effectively shielded by or tucked inside of the first screen 56 when in its retracted position as shown in FIGS. 5 and 9 and extends outside of or beyond the outer first screen 56 when in its deployed position as shown in FIGS. 6, 10 and 11. However, it will be appreciated by those skilled in the art that other arrangements of the screens 56, 60 are possible without departing from the spirit and scope of the invention. In at least one such embodiment, as illustrated in FIG. 1, the second screen 60 is rotatably engaged with and configured for riding within an at least one curved screen track 62 positioned within the housing 44. The second screen 60 provides a plurality of teeth (not shown) configured for engaging an at least one geared motor 64 mounted on the housing 44. Thus, the geared motor 64 is capable of selectively moving the second screen 60 along the at least one screen track 62 between the retracted and deployed positions. In another such embodiment, as illustrated best in FIGS. 7 and 9, the screen track 62 is rotatably engaged with the housing frame 48, proximal a top end 66 of the housing frame 48, such that the screen track 62 is capable of rotating about the main shaft 22, independent of the housing 44 itself. The screen track 62 provides a plurality of teeth 68 configured for engaging the at least one geared motor 64 mounted on the housing frame 48. Thus, in such an embodiment, the geared motor 64 is capable of selectively moving and rotating the screen track 62 along the housing frame 48, around the main shaft 22, thereby moving the second screen 60 along with the screen track 62 between the retracted and deployed positions. In at least one embodiment, as illustrated in FIGS. 5 and 6, the housing 44 provides a pair of travel stops 70 and 72 for limiting the rotational range of the screen track 62 and/or second screen 60—a first travel stop 70 establishing a limit for the retracted position, and a second travel stop 72 establishing a limit for the deployed position. In still further embodiments, any other means capable of selectively moving the second screen 60 between the retracted and deployed positions, now known or later developed, may be substituted and so are intended to be included within the scope of the present invention. As shown particularly in FIGS. 7 and 9, the curved screen track 62 is substantially circular, though it will be appreciated that the track 62 may be semi-circular or some other curved configuration short of a complete circle, depending on the angle through which the second screen 60 is to rotate, the mechanical arrangement for shifting the second screen 60 between its retracted and deployed positions, and other such factors.

As mentioned above, the primary purpose for the second screen 60, in at least one embodiment, is to selectively and at least partially shield the catch portion 40 from the wind W when in the deployed position. Given that the catch portion 40 is the portion of the blade assembly 30 circumference C that is intended to interact with the wind W for rotating the blade assembly 30, the second screen 60 normally remains in the retracted position during use. However, upon the occurrence of certain pre-determined environmental conditions that would otherwise cause the blade assembly 30 to reach potentially damaging rotational speeds (as discussed further below), the second screen 60 is selectively moved into the deployed position. Thus, as the second screen 60 is deployed, the amount of the catch portion 40 that is left exposed to the wind W is reduced which, in turn, reduces the rotational speed of the blade assembly 30. As such, as the second screen 60 is moved from the retracted position to the deployed position, the rotational speed of the blade assembly 30 is gradually reduced without having to physically brake the blade assembly 30—instead, the second screen 60 effectively "brakes" the wind. However, in at least one embodiment, the apparatus 20 does provide a physical brake (not shown) positioned and configured for physically braking the blade assembly 30 (either directly or via the gear box 34)—such physical brake intended to only be used in emergency situations where a relatively immediate rotational stoppage is warranted. In at least one such embodiment, the physical brake is capable of being manually operated by hand or other mechanism. In another such embodiment, the physical brake is capable of being operated automatically by the apparatus 20 or remotely by a computer or human.

It should be noted that while the second screen 60 has been described as moving between the retracted position and deployed position, in at least one further embodiment, the second screen 60 may be capable of moving into more than one deployed position based on select pre-defined wind speed thresholds. For example, in one such embodiment, as illustrated in FIGS. 9-11, the second screen 60 may be capable of operating in the retracted position during normal wind speeds (FIG. 9); in the event the wind speed increases to a point considered to be in excess of "normal wind speeds" but not quite reaching a survival speed, the second screen 60 may be moved into a first deployed position wherein a portion of the catch portion 40 is shielded by the second screen 60 (FIG. 10); and in the event the wind speed increases further so as to reach (or at least come close to) the survival speed, the second screen 60 may be moved into a second deployed position wherein the entire catch portion 40 is shielded by the second screen 60 (FIG. 11). The above example is merely exemplary, such that further embodiments of the apparatus 20 may incorporate any number of deployed positions for the second screen 60. It should also be noted that the wind speed threshold associated with each deployed position is dependent in part on the calculated survival speed for the associated blade assembly 30, which is dependent in part on the size, shape, position, configuration, and number of blades 32 that are provided by the blade assembly 30. In other words, the specific wind speed thresholds associated with each deployed position may vary from one embodiment to another.

In at least one embodiment, the apparatus 20 provides a controller 74 configured for automatically controlling the movement of the second screen 60 between the retracted and deployed positions. Thus, upon the controller 74 detecting certain pre-determined environmental conditions that would otherwise cause the blade assembly 30 to reach potentially damaging rotational speeds, the controller 74 is able to cause the second screen 60 to move into the appropriate deployed position. Upon the controller 74 subsequently determining that the previously detected environmental conditions are no longer present, the controller 74 is able to cause the second screen 60 to move into the retracted position—or, alternatively, into a relatively less deployed position for exposing relatively more of the catch portion 40 of the blade assembly 30. Alternatively, the controller 74 may cause the second screen 60 to move into the retracted position after a pre-defined period of time has elapsed. In at least one embodiment, the controller 74 is positioned proximal the lower end 26 of the main shaft 22 so as to allow for easy access for maintenance purposes. In one such embodiment, the controller 74 is positioned within the removable cover 38 so as to be selectively shielded from environmental elements. In still further embodiments, the controller 74 may be positioned elsewhere on or near the apparatus 22. Additionally, in at least one embodiment, the controller 74 may be configured for being remotely monitored and/or controlled.

In at least one embodiment, the apparatus 20 further provides an at least one detection device 76 in communication with the controller 74 and configured for assisting the controller 74 in determining when to deploy and retract the second screen 60. In one such embodiment, as shown in FIG. 1, the detection device 76 is an anemometer 78 appropriately positioned on the apparatus 20 and configured for determining wind speed, such that the controller 74 is configured for selectively controlling the second screen 60 based on one or more pre-defined wind speed thresholds. In another such embodiment, the detection device 76 is a tachometer (not shown) appropriately positioned on the apparatus 20 and configured for determining the rotational speed of the blade assembly 30 (either directly or via the gear box 34), such that the controller 74 is configured for selectively controlling the second screen 60 based on one or more pre-defined rotational speed thresholds. In another such embodiment, the detection device 76 is a precipitation sensor (not shown) appropriately positioned on the apparatus 20 and configured for determining the amount of precipitation (i.e., rain, sleet, snow, hail, etc.) in the air, such that the controller 74 is configured for selectively controlling the second screen 60 based on one or more pre-defined precipitation level thresholds. In a still further embodiment, the detection device 76 may be any other device, now known or later developed, capable of detecting and/or measuring any number of environmental conditions that would otherwise potentially damage the blade assembly 30 or other components of the apparatus 20. In still further embodiments, the detection device 76 may comprise any combination of such devices for detecting and/or measuring a plurality of such environmental conditions.

In at least one alternate embodiment, rather than the apparatus 20 providing the controller 74 for determining and automatically controlling the movement of the second screen 60 between the retracted and deployed positions, control of the second screen 60 is instead accomplished mechanically. For example, in one such embodiment, the housing 44 may provide a spring (not shown) configured for biasing the second screen 60 into the retracted position, the spring having a resistance capable of being overcome by a pre-determined wind speed (or, alternatively, a pre-determined blade assembly 30 rotational speed), such that the second screen 60 is then physically urged into the appropriate deployed position, as by providing an airfoil, scoop or the like (not shown) on the second screen 60, for example. Upon wind speeds subsequently decreasing, the tension of the spring causes the second screen 60 to move back into the retracted position. In still further embodiments, again, any other means capable of selectively moving the second screen 60 between the retracted and deployed positions, now known or later developed, may be substituted and so are intended to be included within the scope of the present invention.

In at least one embodiment, the apparatus 20 further provides an at least one motion sensor (not shown)—or other type of optical sensor—positioned and configured for detecting approaching objects, such as humans, animals, etc. The at least one motion sensor is in communication with the controller 74 such that, upon the motion sensor detecting an approaching object, the controller 74 may cause the second screen 60 to move into the deployed position so as to shield the blade assembly 30. Accordingly, in such an embodiment, the apparatus 20 is capable of preventing such objects from coming into contact with the blade assembly 30, thereby protecting both the blade assembly 30 as well as the object. Upon the controller 74 subsequently determining that the previously detected object is no longer present or at least within range, the controller 74 is able to cause the second screen 60 to move back into the retracted position. Alternatively, the controller 74 may cause the second screen 60 to move into the retracted position after a pre-defined period of time has elapsed. Relatedly, in at least one embodiment, the controller 74 is configured for moving the second screen 60 into the deployed position when the apparatus 20 is not in use, or when there is insufficient wind W present for causing the blade assembly 30 to rotate. In this way, the second screen 60 is able to fully shield the catch portion 40 such that the apparatus 20 is better able to prevent animals—such as birds, for example—from entering the housing 44 when the blade assembly 30 is not rotating.

In at least one embodiment, as shown in FIG. 1, the apparatus 20 further provides an at least one lightning rod 80 where the apparatus 20 is positioned or otherwise used in a location having a risk of lightning strikes. In at least one such embodiment, the lightning rod 80 is interconnected with a ground wire of the generator 36.

In at least one embodiment, as also shown in FIG. 1, the apparatus 20 further provides an at least one obstruction light 82 where the apparatus 20 is positioned or otherwise used in a location that requires the use of such a light 82 for safety reasons.

In at least one embodiment, the apparatus 20 further provides an at least one solar panel (not shown) positioned and configured for assisting in the powering of the various electrical components that the apparatus 20 may incorporate.

Aspects of the present specification may also be described as follows:

1. A vertical-axis wind turbine apparatus comprising: a substantially vertically-oriented main shaft; a blade assembly coaxially aligned with and rotatably engaged about the main shaft, the blade assembly providing an at least one blade radially projecting therefrom; the blade assembly having a circumference that comprises a catch portion, wherein the at least one blade catches the wind, and a return portion, wherein the at least one blade carries out its revolution about the main shaft before returning to catch the wind once again; and a housing rotatably engaged with the main shaft and configured for selectively encompassing the blade assembly, the housing comprising: a first screen integral with the housing and configured for shielding the return portion of the blade assembly circumference from the wind; and a second screen rotatably engaged with the housing and configured for selectively moving between a retracted position, wherein the second screen is positioned substantially adjacent to the first screen such that the catch portion of the blade assembly circumference is exposed, and a deployed position, wherein the second screen is rotated away from the first screen for at least partially shielding the catch portion from the wind; whereby, during use of the apparatus, the second screen is capable of selectively moving into the deployed position upon the occurrence of pre-determined environmental conditions that would otherwise potentially damage the blade assembly.

2. The apparatus according to embodiment 1, wherein the housing further comprises a housing top positioned proximal an upper end of the main shaft.

3. The apparatus according to embodiments 1-2, wherein the housing further comprises a weather vane fixedly mounted on the housing top and configured for causing the housing to selectively rotate about the main shaft and orient the catch portion of the blade assembly circumference into the wind.

4. The apparatus according to embodiments 1-3, wherein the housing further comprises a housing frame coupled to the main shaft.

5. The apparatus according to embodiments 1-4, wherein the second screen is positioned on a curved screen track rotatably engaged with the housing frame proximal a top end of the housing frame.

6. The apparatus according to embodiments 1-5, wherein the screen track provides a plurality of teeth configured for engaging a geared motor mounted on the housing frame, the geared motor configured for mechanically moving the second screen between the retracted and deployed positions.

7. The apparatus according to embodiments 1-6, wherein a bottom end of the housing frame is rotatably engaged with a base plate integral with a lower end of the main shaft.

8. The apparatus according to embodiments 1-7, wherein the bottom end of the housing frame provides a plurality of rollers positioned and configured for riding within a circular frame track provided by the base plate of the main shaft.

9. The apparatus according to embodiments 1-8, wherein the blade assembly is mechanically linked to a gear box configured for capturing and transferring the mechanical energy generated by the rotating blade assembly.

10. The apparatus according to embodiments 1-9, wherein the gear box is mechanically linked to a generator for converting the transferred mechanical energy into electricity.

11. The apparatus according to embodiments 1-10, wherein each of the gear box and generator is positioned proximal a lower end of the main shaft.

12. The apparatus according to embodiments 1-11, further comprising a removable cover positioned and configured for selectively shielding the gear box and generator from the environment.

13. The apparatus according to embodiments 1-12, further comprising a controller configured for automatically controlling the movement of the second screen between the retracted and deployed positions.

14. The apparatus according to embodiments 1-13, wherein the controller is positioned proximal a lower end of the main shaft.

15. The apparatus according to embodiments 1-14, further comprising an at least one detection device in communication with the controller and configured for assisting the controller in determining when to deploy and retract the second screen.

16. The apparatus according to embodiments 1-15, wherein the detection device is an anemometer configured for determining wind speed.

17. The apparatus according to embodiments 1-16, wherein the detection device is a tachometer configured for determining the rotational speed of the blade assembly.

18. The apparatus according to embodiments 1-17, wherein the detection device is a precipitation sensor configured for determining the amount of precipitation in the air.

19. The apparatus according to embodiments 1-18, wherein the housing further comprises a lightning rod.

20. The apparatus according to embodiments 1-19, wherein the housing further comprises an at least one obstruction light.

21. The apparatus according to embodiments 1-20, wherein the housing further comprises an at least one solar panel configured for assisting in powering the apparatus.

22. A vertical-axis wind turbine apparatus comprising: a substantially vertically-oriented main shaft; a blade assembly coaxially aligned with and rotatably engaged about the main shaft, the blade assembly providing an at least one blade radially projecting therefrom; the blade assembly having a circumference that comprises a catch portion, wherein the at least one blade catches the wind, and a return portion, wherein the at least one blade carries out its revolution about the main shaft before returning to catch the wind once again; and a housing rotatably engaged with the main shaft and configured for selectively encompassing the blade assembly, the housing comprising: a curved first screen integral with the housing and configured for shielding the return portion of the blade assembly circumference from the wind; and a curved second screen rotatably engaged with the housing substantially coaxial with the first screen and configured for selectively moving between a retracted position, wherein the second screen is positioned substantially adjacent to the first screen such that the catch portion of the blade assembly circumference is exposed, and a deployed position, wherein the second screen is rotated away from the first screen for at least partially shielding the catch portion from the wind; whereby, during use of the apparatus, the second screen is capable of selectively moving into the deployed position upon the occurrence of pre-determined environmental conditions that would otherwise potentially damage the blade assembly.

23. A vertical-axis wind turbine apparatus comprising: a substantially vertically-oriented main shaft; a blade assembly coaxially aligned with and rotatably engaged about the main shaft, the blade assembly providing an at least one blade radially projecting therefrom; the blade assembly having a circumference that comprises a catch portion, wherein the at least one blade catches the wind, and a return portion, wherein the at least one blade carries out its revolution about the main shaft before returning to catch the wind once again; a housing rotatably engaged with the main shaft and configured for selectively encompassing the blade assembly, the housing comprising: a first screen integral with the housing and configured for shielding the return portion of the blade assembly circumference from the wind; and a second screen rotatably engaged with the housing and configured for selectively moving between a retracted position, wherein the second screen is positioned substantially adjacent to the first screen such that the catch portion of the blade assembly circumference is exposed, and a deployed position, wherein the second screen is rotated away from the first screen for at least partially shielding the catch portion from the wind; a controller configured for automatically controlling the movement of the second screen between the retracted and deployed positions; and a detection device in communication with the controller and configured for assisting the controller in determining when to deploy and retract the second screen; whereby, during use of the apparatus, the second screen is capable of selectively moving into the deployed position upon the occurrence of pre-determined environmental conditions that would otherwise potentially damage the blade assembly.

In closing, regarding the exemplary embodiments of the present invention as shown and described herein, it will be appreciated that a vertical-axis wind turbine apparatus having a protective screen is disclosed. Because the principles of the invention may be practiced in a number of configurations beyond those shown and described, it is to be understood that the invention is not in any way limited by the exemplary embodiments, but is generally directed to a vertical-axis wind turbine apparatus having a protective screen and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention. Furthermore, the various features of each of the above-described embodiments may be combined in any logical manner and are intended to be included within the scope of the present invention.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar referents used in the context of describing the present invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the present invention so claimed are inherently or expressly described and enabled herein.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A vertical-axis wind turbine apparatus comprising:
   a substantially vertically-oriented main shaft;
   a blade assembly coaxially aligned with and rotatably engaged about the main shaft, the blade assembly providing an at least one blade radially projecting therefrom;
   the blade assembly having a circumference that comprises a catch portion, wherein the at least one blade catches the wind, and a return portion, wherein the at least one blade carries out its revolution about the main shaft before returning to catch the wind once again; and
   a housing rotatably engaged with the main shaft and configured for selectively encompassing the blade assembly, the housing comprising:
     a housing frame rotatably engaged with a base plate integral with a lower end of the main shaft;
     a first screen integral with the housing and configured for shielding the return portion of the blade assembly circumference from the wind; and
     a second screen rotatably engaged with the housing and configured for selectively moving between a retracted position, wherein the second screen is positioned substantially adjacent to the first screen such that the catch portion of the blade assembly circumference is exposed, and a deployed position, wherein the second screen is rotated away from the first screen for at least partially shielding the catch portion from the wind;

whereby, during use of the apparatus, the second screen is capable of selectively moving into the deployed position upon the occurrence of pre-determined environmental conditions that would otherwise potentially damage the blade assembly.

2. The apparatus of claim 1, wherein the housing further comprises:
 a housing top positioned proximal an upper end of the main shaft; and
 a weather vane fixedly mounted on the housing top and configured for causing the housing to selectively rotate about the main shaft and orient the catch portion of the blade assembly circumference into the wind.

3. The apparatus of claim 1, wherein the second screen is positioned on a curved screen track rotatably engaged with the housing frame proximal a top end of the housing frame.

4. The apparatus of claim 3, wherein the screen track provides a plurality of teeth configured for engaging a geared motor mounted on the housing frame, the geared motor configured for mechanically moving the second screen between the retracted and deployed positions.

5. The apparatus of claim 1, wherein a bottom end of the housing frame is rotatably engaged with the base plate.

6. The apparatus of claim 5, wherein the bottom end of the housing frame provides a plurality of rollers positioned and configured for riding within a circular frame track provided by the base plate of the main shaft.

7. The apparatus of claim 1, wherein the blade assembly is mechanically linked to a gear box configured for capturing and transferring mechanical energy generated by the rotating blade assembly.

8. The apparatus of claim 7, wherein the gear box is mechanically linked to a generator for converting the transferred mechanical energy into electricity.

9. The apparatus of claim 8, wherein each of the gear box and generator is positioned proximal a lower end of the main shaft.

10. The apparatus of claim 9, further comprising a removable cover positioned and configured for selectively shielding the gear box and generator from the environment.

11. The apparatus of claim 1, further comprising a controller configured for automatically controlling the movement of the second screen between the retracted and deployed positions.

12. The apparatus of claim 11, wherein the controller is positioned proximal a lower end of the main shaft.

13. The apparatus of claim 11, further comprising an at least one detection device in communication with the controller and configured for assisting the controller in determining when to deploy and retract the second screen.

14. The apparatus of claim 13, wherein the at least one detection device is selected from at least one of an anemometer configured for determining wind speed, a tachometer configured for determining the rotational speed of the blade assembly, and a precipitation sensor configured for determining the amount of precipitation in the air.

15. The apparatus of claim 1, wherein the housing further comprises a lightning rod.

16. The apparatus of claim 1, wherein the housing further comprises an at least one obstruction light.

17. The apparatus of claim 1, wherein the housing further comprises an at least one solar panel configured for assisting in powering the apparatus.

18. A vertical-axis wind turbine apparatus comprising:
a substantially vertically-oriented main shaft;
a blade assembly coaxially aligned with and rotatably engaged about the main shaft, the blade assembly providing an at least one blade radially projecting therefrom;
the blade assembly having a circumference that comprises a catch portion, wherein the at least one blade catches the wind, and a return portion, wherein the at least one blade carries out its revolution about the main shaft before returning to catch the wind once again; and
a housing rotatably engaged with the main shaft and configured for selectively encompassing the blade assembly, the housing comprising:
 a housing frame rotatably engaged with a base plate integral with a lower end of the main shaft;
 a curved first screen integral with the housing and configured for shielding the return portion of the blade assembly circumference from the wind; and
 a curved second screen rotatably engaged with the housing substantially coaxial with the first screen and configured for selectively moving between a retracted position, wherein the second screen is positioned substantially adjacent to the first screen such that the catch portion of the blade assembly circumference is exposed, and a deployed position, wherein the second screen is rotated away from the first screen for at least partially shielding the catch portion from the wind;
whereby, during use of the apparatus, the second screen is capable of selectively moving into the deployed position upon the occurrence of pre-determined environmental conditions that would otherwise potentially damage the blade assembly.

19. A vertical-axis wind turbine apparatus comprising:
a substantially vertically-oriented main shaft;
a blade assembly coaxially aligned with and rotatably engaged about the main shaft, the blade assembly providing an at least one blade radially projecting therefrom;
the blade assembly having a circumference that comprises a catch portion, wherein the at least one blade catches the wind, and a return portion, wherein the at least one blade carries out its revolution about the main shaft before returning to catch the wind once again;
a housing rotatably engaged with the main shaft and configured for selectively encompassing the blade assembly, the housing comprising:
 a housing frame rotatably engaged with a base plate integral with a lower end of the main shaft;
 a first screen integral with the housing and configured for shielding the return portion of the blade assembly circumference from the wind; and
 a second screen rotatably engaged with the housing and configured for selectively moving between a retracted position, wherein the second screen is positioned substantially adjacent to the first screen such that the catch portion of the blade assembly circumference is exposed, and a deployed position, wherein the second screen is rotated away from the first screen for at least partially shielding the catch portion from the wind;
a controller configured for automatically controlling the movement of the second screen between the retracted and deployed positions; and a detection device in communication with the controller and configured for assisting the controller in determining when to deploy and retract the second screen;

whereby, during use of the apparatus, the second screen is capable of selectively moving into the deployed position upon the occurrence of pre-determined environmental conditions that would otherwise potentially damage the blade assembly.

* * * * *